US008182000B2

(12) United States Patent
Mitchell, Jr. et al.

(10) Patent No.: US 8,182,000 B2
(45) Date of Patent: May 22, 2012

(54) INTEGRATED DUAL PAWL LATCHING MECHANISM

(75) Inventors: Daniel Mitchell, Jr., Southgate, MI (US); James Scott Simon, Shelby Township, MI (US); Stacey H. Raines, Ypsilanti, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 400 days.

(21) Appl. No.: 12/507,409

(22) Filed: Jul. 22, 2009

(65) Prior Publication Data

US 2011/0018286 A1    Jan. 27, 2011

(51) Int. Cl.
*E05C 19/06* (2006.01)
*E05C 19/00* (2006.01)

(52) U.S. Cl. .................... 292/19; 292/91; 292/DIG. 11; 292/DIG. 16; 292/DIG. 38

(58) Field of Classification Search .................... 292/10, 292/13, 17, 19, 20, 38, 50, 74, 173, DIG. 16, 292/DIG. 38, 1, 32, 42, 76, 80, 81, 84, 87, 292/91, 125, 133, 161, 163, 171, 176, 302, 292/303, DIG. 11, DIG. 61, DIG. 63; 296/37.12, 296/37.8; 312/222, 223, 332.1
See application file for complete search history.

(56) References Cited

U.S. PATENT DOCUMENTS

| | | | | |
|---|---|---|---|---|
| 307,257 A * | 10/1884 | Bacon | ............................. | 292/19 |
| 593,753 A * | 11/1897 | Myers et al. | ..................... | 292/20 |
| 609,913 A * | 8/1898 | Sheer | .............................. | 292/20 |
| 650,678 A * | 5/1900 | Greenwood | ..................... | 292/20 |
| 1,691,975 A * | 11/1928 | Irwin | ................................ | 70/168 |
| 1,728,530 A * | 9/1929 | Drenning | ....................... | 292/218 |
| 1,835,100 A * | 12/1931 | Symington | .................... | 292/218 |
| 1,929,371 A * | 10/1933 | Hamilton | .......................... | 292/7 |
| 1,933,898 A * | 11/1933 | Falk | ............................... | 292/218 |
| 1,934,397 A * | 11/1933 | Bales et al. | .................... | 292/175 |
| 2,297,865 A * | 10/1942 | Behlen | ............................ | 292/19 |
| 2,592,869 A * | 4/1952 | Dedman | .......................... | 217/56 |
| 2,689,777 A * | 9/1954 | Wolters | ....................... | 312/332.1 |
| 4,436,201 A * | 3/1984 | Inaba | ............................ | 206/309 |
| 5,823,583 A | 10/1998 | Sandhu et al. | | |
| 5,997,115 A * | 12/1999 | Radloff et al. | ................ | 312/222 |

(Continued)

OTHER PUBLICATIONS

Fisher Price Space Saver High Chair, Model J5933, Photographed May 5, 2009.

*Primary Examiner* — Carlos Lugo
*Assistant Examiner* — Alyson M Merlino
(74) *Attorney, Agent, or Firm* — MacMillan, Sobanski & Todd, LLC

(57) ABSTRACT

A latch mechanism is provided for securing a storage compartment door within a vehicle. The latch mechanism includes a mounting bracket, a handle, and an undivided, one piece latching member. The latching member includes a main body portion, a first pliable leg portion, a second pliable leg portion, a first post portion, and a second post portion. The latching member is in a relaxed position when the handle is in the latched position and a flexed position when the handle is in the unlatched position. The handle includes at least one abutment member for displacing the main body portion of the latching member as the handle is pivoted from the latched position to the unlatched position. Displacement of the main body portion causes the first and second pliable leg portions to resiliently retract which retracts the first post member and the second post member from extended post positions to retracted post positions.

14 Claims, 5 Drawing Sheets

U.S. PATENT DOCUMENTS

| | | |
|---|---|---|
| 6,152,501 A | 11/2000 | Magi et al. |
| 6,356,436 B1 * | 3/2002 | Buican et al. ............ 361/679.58 |
| 6,373,690 B1 * | 4/2002 | Buican et al. ............ 361/679.59 |
| 6,899,407 B1 * | 5/2005 | Lai ............................ 312/223.2 |
| 7,004,517 B2 | 2/2006 | Vitry et al. |
| 7,140,650 B2 * | 11/2006 | Berg ................................ 292/67 |
| 7,370,901 B2 | 5/2008 | Penner et al. |
| 2002/0171248 A1 | 11/2002 | Diss et al. |
| 2003/0006616 A1 * | 1/2003 | Katoh et al. .................... 292/32 |
| 2006/0208495 A1 | 9/2006 | Talukdar et al. |

* cited by examiner

INTEGRATED DUAL PAWL LATCHING MECHANISM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of Invention

This invention relates in general to a vehicle glove box, and in particular to a glove box latching mechanism.

2. Background of Related Art

A glove compartment, also known as a glove box, is a compartment built into a passenger side instrument panel of a vehicle. The glove compartment is typically used for storing miscellaneous items such as gloves and other small convenience items. The glove compartment is pivotable between an opened and closed position. The glove box is secured in the closed position by a latching mechanism. Various types of latching mechanisms are utilized to secure the glove compartment in the closed position. Some of the latching mechanisms utilize gears, pinions, racks, ratchet-type mechanisms.

Glove compartment doors typically pivot outward and downward. When the compartment and door move together, weight of the glove compartment and any contents therein exerts a downward force on the glove compartment thereby. Many glove compartments utilize a dual post latch mechanism which better supports the door when in the closed position. The dual post latching mechanism utilizes numerous individual subcomponents which make up the latching mechanism and the handle. The number of subcomponents not only increases the overall cost of having to manufacture each item of the latching mechanism, but the increases the cost and time to assemble the latching mechanism. It would be desirable to reduce the parts cost and the time and cost of the assembly operations.

BRIEF SUMMARY OF THE INVENTION

The present invention has the advantage reducing the number of components required for a latching mechanism for a storage compartment. The latching mechanism includes three components wherein the latching member that includes a spring-like member for maintaining a restorative force on the handle is an undivided, one piece component. The latching mechanism requires minimal assembly time and cost as a result of the design and cooperation of the three components.

In one aspect of the present invention, a latch mechanism is provided for securing a storage compartment door within a vehicle. The storage compartment door has an aperture extending therethrough for mounting the latch mechanism. The latch mechanism includes a mounting bracket configured to be secured to the storage compartment door. A handle is pivotably coupled to the mounting bracket. The handle pivots between a latched position and an unlatched position. An undivided, one piece latching member includes a main body portion, a first pliable leg portion, a second pliable leg portion, a first post portion, and a second post portion. The latching member is configured to be retained on the storage compartment door. The latching member is in a relaxed position when the handle is in the latched position and a flexed position when the handle is in the unlatched position. The first and second post members are in extended post positions when the latching member is in the relaxed position. The first and second post members are in retracted post positions when the latching member is in the flexed position. The handle includes at least one abutment member for displacing the main body portion of the latching member as the handle is pivoted from the latched position to the unlatched position. The displacement of the main body portion causes the first pliable leg portion and the second pliable leg portion to resiliently retract. The retraction of the first pliable leg portion and the second pliable leg portion retracts the first post member and the second post member from the extended post positions to the retracted post positions.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
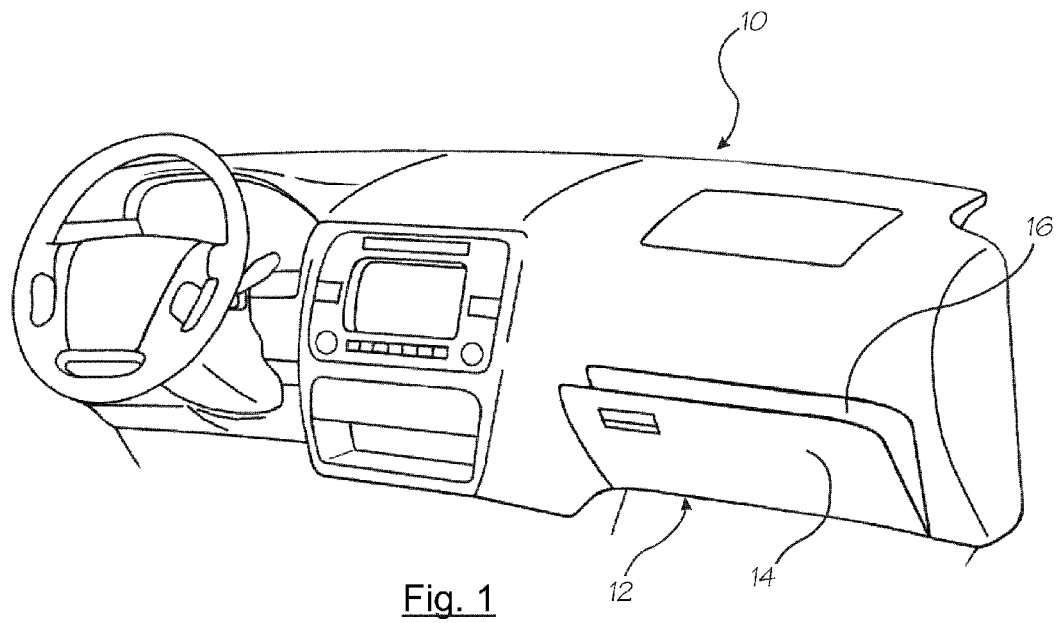
FIG. 1 is a perspective view of a vehicle instrument panel according to an embodiment of the present invention.

Referring now to the drawings, there is illustrated in FIG. 1, a vehicle interior instrument panel 10. The vehicle instrument panel 10 includes a storage compartment 12, such as a glove compartment for storing miscellaneous items. The storage compartment 12 includes a storage compartment door 14 that provides access to a housing 16 that is disposed within the instrument panel 10. Preferably, the storage compartment door 14 is pivotable between an access position (i.e., open position) and a closed position (i.e., secured position). Alternatively, the storage compartment door 14 may be integrated as one of the side panels of the housing whereby the housing as a whole pivots into the interior passenger compartment of the vehicle for gaining access thereto.

Figure 2:
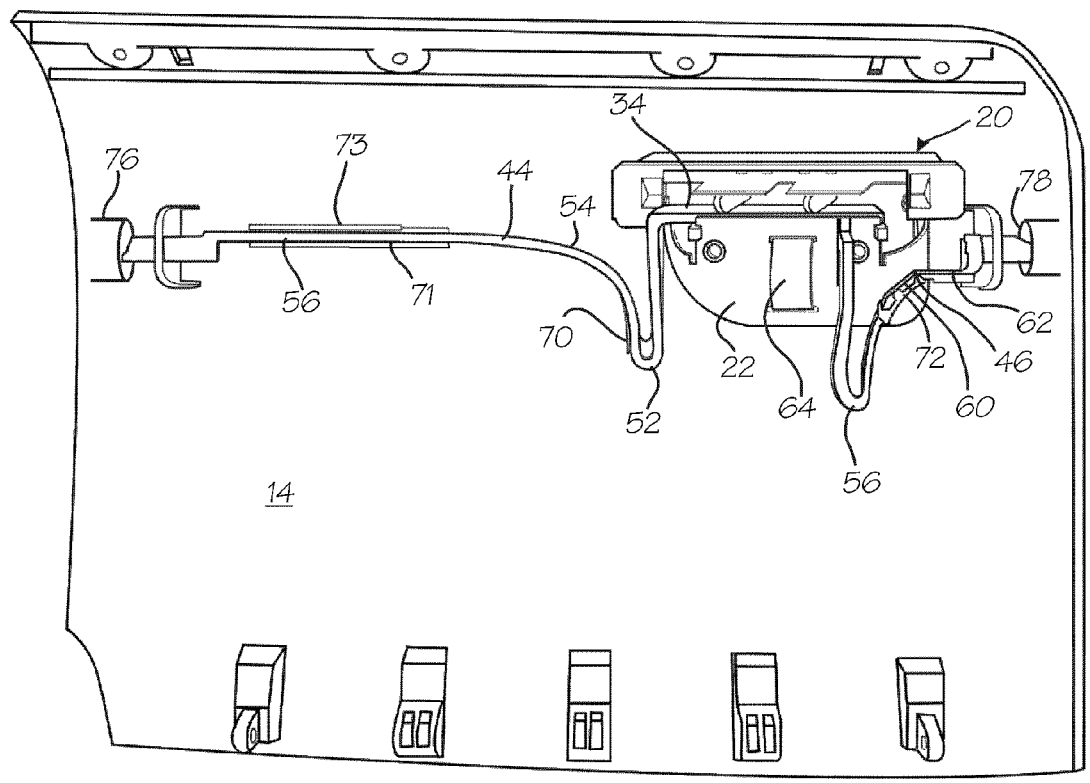
FIG. 2 is a perspective view of a vehicle storage compartment door according to the embodiment of the present invention.
Figure 3:
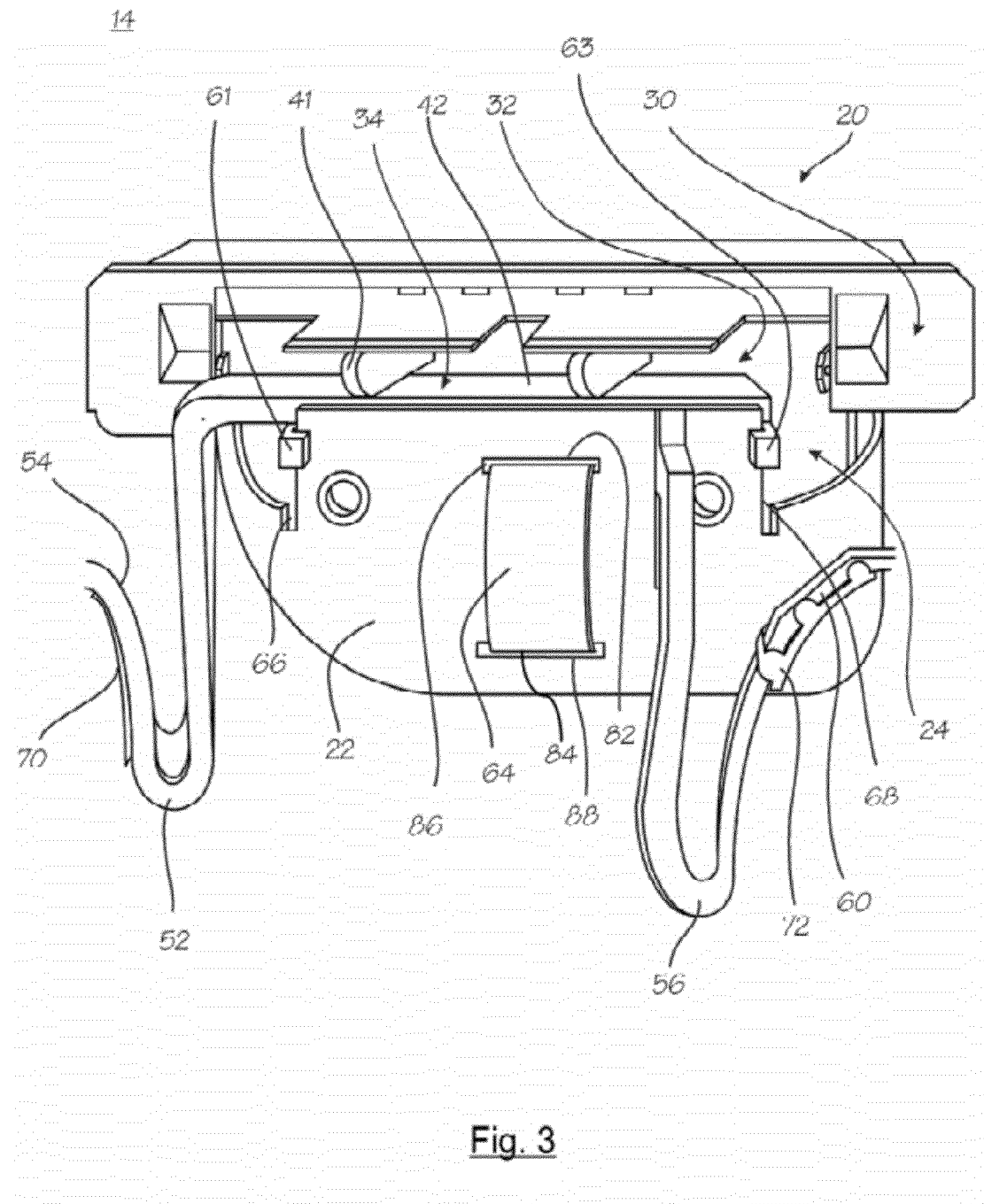
FIG. 3 is a perspective view of a latching mechanism of the storage compartment door according to the embodiment of the present invention.

Referring both to FIGS. 2 and 3, a latching mechanism 20 is mounted to the vehicle compartment door 14 for securing the storage compartment door 14 in the closed position. The storage compartment door 14 further includes a pocket 22 and an aperture 24 for receiving the latching mechanism 20. The pocket 22 is formed by a recess in the storage compartment door 14. The aperture 24 is formed over a portion of the pocket 22 for operatively coupling the subcomponents of the latching mechanism 20 on both sides of the compartment door 14.

The latching mechanism 20 is comprised of three components that include a mounting bracket 30, a handle 32, and a latching member 34. Each of the three components of the latching mechanism 20 is preferably made from a plastic material which reduces cost and is easily moldable into their desired shape. Alternatively, other materials or composites may be used if required.

Figure 4:
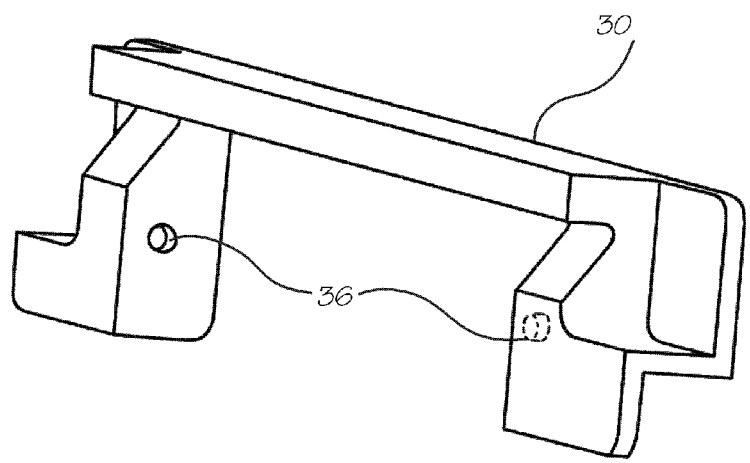
FIG. 4 is a perspective view of a mounting bracket according to the embodiment of the present invention.

FIG. 4 illustrates the mounting bracket 30 of the latching mechanism 20. The mounting bracket 30 is a rigid component that is fixedly mounted to the storage compartment door 14. The mounting bracket 30 extends through the aperture 24 thereby creating a base for the handle 32 to attach thereto. The mounting bracket 30 includes a pair of apertures 36 configured for receiving pin-like members for coupling the handle 32 to the mounting bracket 30.

Figure 5:
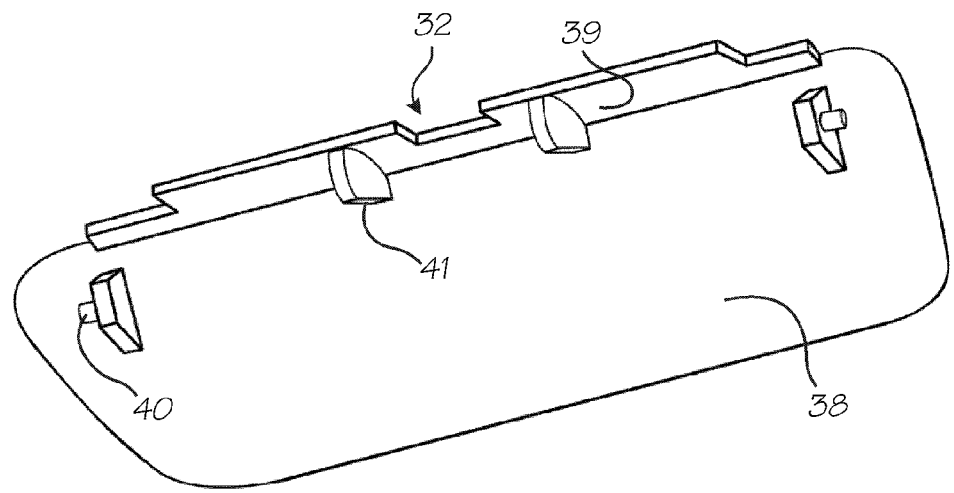
FIG. 5 is a perspective view of a handle according to the embodiment of the present invention.
Figure 6:
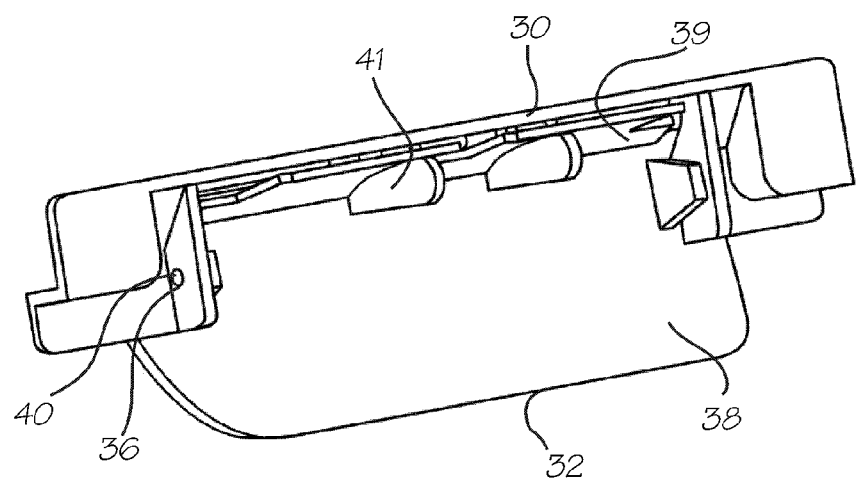
FIG. 6 is a perspective view of a subassembly of the handle and the mounting bracket according to the embodiment of the present invention.

FIG. 5 illustrates the handle 32 of the latching mechanism 20. The handle 32 includes a substantially planar surface 38 for allowing an external force to be exerted on the handle 32 for moving the handle from a latched position to an unlatched position. The handle 32 further includes a pair of pin members 40 that are received in the apertures 36 of the mounting bracket 30. The pin members 40 couple the handle 32 to the mounting bracket 30 and allow the handle 32 to be pivotably moved from the latched position to the unlatched position when the external force is exerted. The handle 32 also includes a substantially planar surface 39 configured at a substantially right angle to the substantially planar surface 38. The substantially planar surface 39 includes at least one abutment member 41 for making contact with the latching member 34 which will be discussed in detail later. It should be understood that the handle may take on different configurations without deviating from the scope of the invention. A subassembly of the mounting bracket 30 and the handle 32 is generally shown in FIG. 6.

Figure 7:
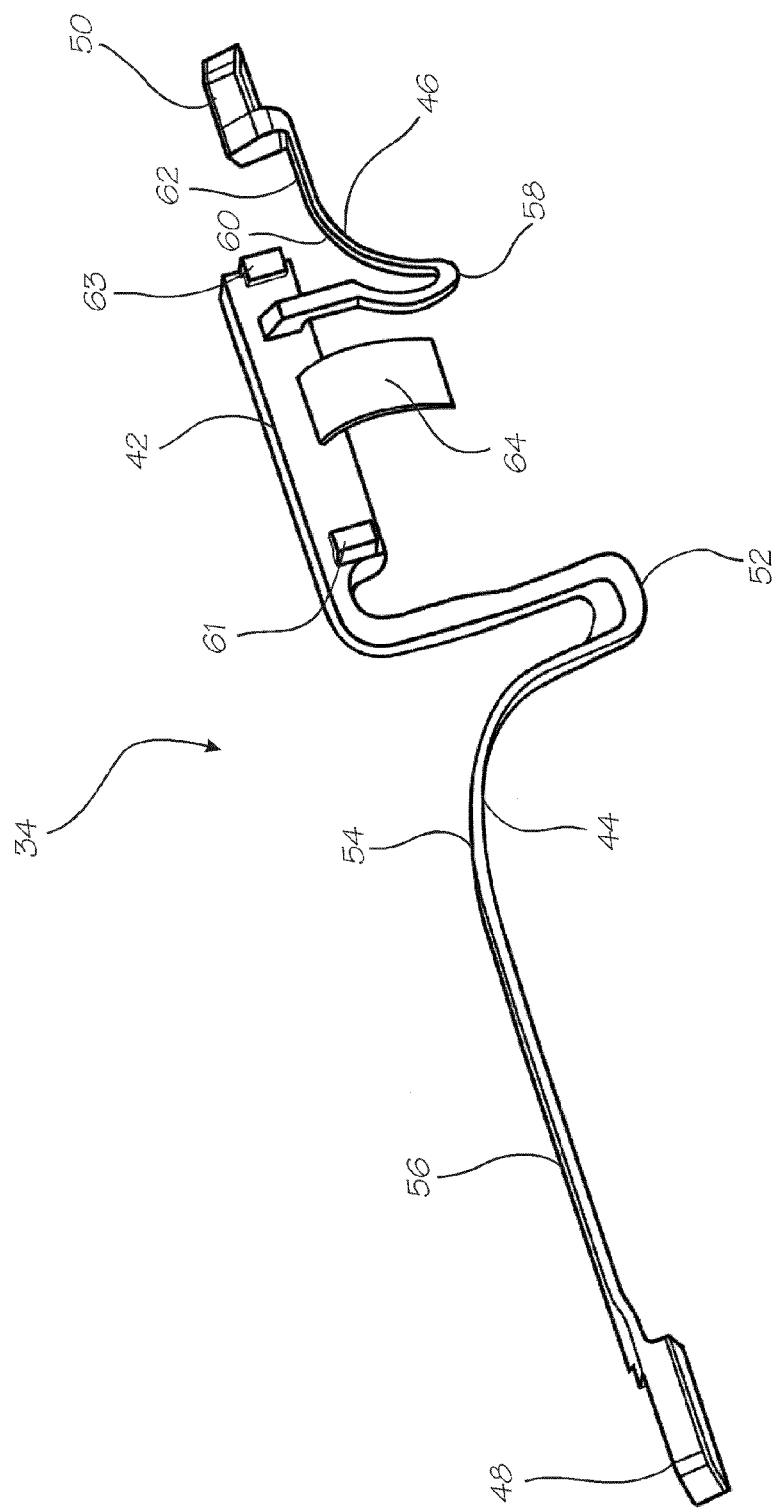
FIG. 7 is a perspective view of a latching member according to the embodiment of the present invention.

FIG. 7 illustrates the latching member 34 of the latching mechanism 20. The latching member 34 is an undivided, one piece component that includes a main body portion 42, a first pliable leg portion 44, a second pliable leg portion 46, a first post portion 48, and a second post portion 50. The main body portion 42 is a rigid part of the latching member 34 that is disposed between the first pliable leg portion 44 and the second pliable leg portion 46. The first pliable leg portion 44 and the second pliable leg portion 46 are serpentine shaped. The first pliable leg portion 44 has a substantially U-shaped section 52, an arcuately shaped section 54, and a lateral extending section 56. The substantially U-shaped section 52 is integrally formed to the main body portion 42 and extends to the arcuately shaped section 54. The arcuately shaped section 54 extends from the U-shaped section 52 to the lateral extending section 56. The lateral extending section 56 extends from the arcuately shaped section 54 to the first post portion 48.

The second pliable leg portion 46 has a substantially U-shaped section 58, an arcuately shaped section 60, and a lateral extending section 62. The substantially U-shaped section 58 is integrally formed to the main body portion 42 and extends to the arcuately shaped section 60. The arcuately shaped section 60 extends from the U-shaped section 58 to the lateral extending section 62. The lateral extending section 62 extends from the arcuately shaped section 60 to the second post portion 50.

The first pliable leg portion 44 and the second pliable leg portion 46 flex when the external force is exerted on the handle 32 for retracting the first post portion 48 and the second post portion 50 to their respective retracted post positions. Ends of the first post portion 48 and the second post portion 50 are angled or curved for interacting with strikers that will be described in detail later.

The main body portion 42 of the latching member 34 further includes a first guide member 61, a second guide member 63, and a resilient member 64. The first guide member 61 and the second guide member 63 guide the main body portion 42 as it is displaced by the handle 32. The resilient member 64 projects arcuately away from the main body portion 42 and functions as a spring for forcing the handle 32 to the latched position when no force is applied to the handle 32.

Referring again to FIGS. 2 and 3, the interaction of the operable components of latching mechanism 20 identified above is described as follows. The latching member 34 is retained in the pocket 22 of the storage compartment door 14. The pocket 22 includes a first guide track 66 and a second guide track 68 for receiving the first guide member 61 and the second guide member 63 of the latching member 42, respectively. The first and second guide members 60 and 62 are slideable within the respective guide tracks for maintaining a single axis direction of travel for the main body portion 42.

When an external force is exerted on the handle 32 for pivotably moving the handle 32 from the latched position to the unlatched position, the at least one abutment member 41 contacts the main body portion 42 of the latching member 34 thereby displacing the main body portion 42. As the main body portion 42 is displaced, the first and second guide members 60 and 62 slidingly engage the first and second guide tracks 66 and 68, respectively, thereby maintaining the single axis direction of travel of the main body portion 42.

The compartment door 14 further includes a first arcuate guide member 70 for supporting the first pliable leg member 44 and second arcuate guide member 72 for supporting the second pliable leg member 46. The compartment door 14 may also include, but is not limited, straight guide members 71 and 73 for supporting and biasing the first pliable guide member 44 along the extended lateral section 56. Depending upon the length of the extended lateral section 62 of the second pliable leg member 46, respective straight guide members may be utilized. A displacement of the main body portion 42 along the single axis direction of travel (e.g., downward) results in a flexing of the first pliable leg member 44 and the second pliable leg member 46. When the main body portion 42 is displaced, (e.g., downward), the substantially U-shaped section 52 of the first pliable leg member 44 and the substantially U-shaped section 56 of the second pliable leg member 46 are forced downward. As the main body portion 42 forces the substantially U-shaped section 52 downward, the first arcuate guide member 70 maintains a biasing force on the arcuately shaped section 54 for preventing the arcuately shaped section 54 and the laterally extending section 56 and from being shifted directly downward. As a result, the downward displacement of substantially U-shaped section 52 forces the laterally extending section 56 to retract laterally. That is, the downward shifting of the substantially U-shaped section 52 pulls the arcuately shaped section 54 along the first arcuate guide member 70 which retracts the laterally extending section 56 thereby retracting the first post portion 48 to the retracted post position. The retraction of the first pliable leg member 44 causes the first post member 48 to retract from a first striker 76.

Similar to the operation of retracting the first pliable leg member 46, the substantially U-shaped section 56 of the second pliable leg member 46 is forced downward by the main body portion 42. As the main body portion 42 is forced downward, the second arcuate guide member 72 maintains a biasing force on the arcuately shaped section 56 for preventing the arcuately shaped section 60 and laterally extending section 62 from being shifted directly downward. The downward displacement of substantially U-shaped section 56 pulls the arcuately shaped section 60 along the supporting arcuately shaped guide member 72 which retracts laterally the laterally extending section 62 thereby retracting the second post portion 50 to the retracted post position. The retraction of the second pliable leg member 46 causes the second post member 50 to retract from a second striker 78. The retraction of the first post member 48 from the first striker 76 and the second post member 50 from the second striker 78 unlatches the storage compartment 12 from a closed position to an access position for gaining access to the interior of the housing 16.

The resilient member 64 of the main body portion 42, as described earlier, functions as a spring for retracting the latch mechanism 20 to a retraced position when no extension force is applied to the handle 32. The resilient member 64 that projects arcuately away from the main body portion 42 includes a first end 82 that is integrally formed as part of the main body portion 42 and a second end 84 that terminates in free space. The second end 84 is configured to engage a section of the compartment door 14. The main body portion 42 is disposed within the pocket 22 and the resilient member 64 extends through an aperture 86 formed in the pocket 22 and overlies an opposing side surface of the pocket 22. The arcuate shape of the resilient member 64 is substantially similar to the surface of the pocket for which it overlies.

The second end 84 of the resilient member 64 is fixedly seated in a recess 88 formed in the pocket 22. When a force is transferred from the handle 32 to the main body portion 42 for downwardly displacing the main body portion 42, the second end 84 of the resilient member 64 remains fixedly seated within the recess 88 causing the resilient member 64 to arcuately compress. The resilient member 64 functions as a spring for placing a restorative force on the latching member 42 to force the latching member 42 back to the relaxed position when the external force exerted on the handle 32 is removed. When the handle is pivoted to the unlatched position, the downward movement of the main body member 42 forces the first end 82 of the resilient member 64 downward while the second end 84 of the resilient member 64 remains fixed within the recess 88 thereby resulting an arcuate compression of the resilient member 42. The resilient member 64 maintains a restorative force on the latching member 34 while in a compressed state. When the external force is removed from the handle 32, the restorative force exerted on the latching member 34 as a result of the latching member 34 being in a compressed state forces the latching member 34 to the relaxed position. The main body portion 42 in response to the restorative force exerted by the resilient member 64 exerts a force on the at least one abutment member 41 of the handle 32 thereby returning the handle 32 to the latched position. The resilient member 64 is preferably in a precompressed state when the latching member 42 is in the relaxed position thereby maintaining the handle 32 at the latched position when no external force is present. Alternatively, the recess 88 formed in the pocket 22 may include, but is not limited to, an abutment surface where the second end of the resilient member maintains contact with the abutment surface for fixedly positioning the second end of the resilient member.

Therefore, the handle 32 is in a latched position when no external force is applied to the handle 32 resulting in the first post member 48 and the second post member 50 being in extended post positions for engaging their respective strikers. Alternatively, the handle 32 is in an unlatched position when the external force is applied to the handle 32, thereby pivoting the handle 32 and forcing the latching member 42 to a flexed position. While in the flexed position, the first post member 48 and the second post member 50 are retracted to retracted post positions for allowing the respective post members to disengage with the respective strikers thereby allowing the compartment door 14 to move to the access position.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A latch mechanism for securing a storage compartment door within a vehicle, the storage compartment door having an aperture extending therethrough for mounting the latch mechanism, the latch mechanism comprising:
   a mounting bracket configured to be secured to the storage compartment door;
   a handle pivotably coupled to the mounting bracket, the handle pivoting between a latched position and an unlatched position, an undivided, one piece latching member that includes a main body portion, a first pliable leg portion, a second pliable leg portion, a first post portion, and a second post portion, the latching member configured to be retained on the storage compartment door, the latching member being in a relaxed position to engage strikers disposed within an interior panel of the vehicle when the handle is in the latched position and a flexed position allowing the opening of the storage compartment door when the handle is in the unlatched position, the first and second post members being in extended post positions when the latching member is in the relaxed position, and the first and second post members being in retracted post positions when the latching member is in the flexed position;
   wherein the handle includes at least one abutment member for displacing the main body portion of the latching member as the handle is pivoted from the latched position to the unlatched position, wherein the displacement of the main body portion causes the first pliable leg portion and the second pliable leg portion to resiliently retract, and wherein the retraction of the first pliable leg portion and the second pliable leg portion retracts the first post member and the second post member from the extended post positions to the retracted post positions.

2. The latch mechanism of claim 1 wherein the latching member further includes an integrally formed resilient member extending from the main body portion for maintaining the latching member at the relaxed position in the absence of a force exerted on the handle, the resilient member projecting arcuately away from the main body portion, wherein the resilient member is arcuately compressed in response to an external force applied to the handle pivoting it from the latched position to the unlatched position thereby forcing the latching member out of the relaxed position, and wherein the compressed resilient member forces the main body portion back to the relaxed position and returns handle from the unlatched position to the latched position in response to the external force being removed.

3. The latch mechanism of claim 1 wherein the first pliable leg portion is serpentine shaped.

4. The latch mechanism of claim 3 wherein the second pliable leg portion is serpentine shaped.

5. A storage compartment within an interior panel of a vehicle, the storage compartment including a storage compartment door being pivotable between an access position and a closed position, the storage compartment door being secured in the closed position by latching the storage compartment door to stationary strikers disposed within the interior panel, the storage compartment comprising:
- a housing including the storage compartment door for gaining access to the housing, the storage compartment door having first surface exposed to the interior of the vehicle and a second surface opposite the first surface, the storage compartment door further including an aperture extending through the first surface and the second surface, the storage compartment door further including a pocket formed over a portion of the aperture that recesses into an interior of the housing;
- a mounting bracket extending through the aperture that is fixedly mounted to the storage compartment door;
- a handle pivotably coupled to the mounting bracket, the handle pivoting between a latched position and an unlatched position,
- a undivided, one piece latching member including a main body portion, a first pliable leg portion, a second pliable leg portion, a first post portion, and a second post portion, the latching member being retained in the pocket of the storage compartment door, the latching member being at a relaxed position when the handle is in the latched position and at a flexed position when the handle is in the unlatched position, the first post member and the second post member being in extended post positions when the latching member is in the relaxed position, and wherein the first and second post members being in retracted post positions when the latching member is in the flexed position;
- wherein the handle includes at least one abutment member for displacing the main body portion of the latching member as the handle is pivoted from the latched position to the unlatched position, wherein the displacement of the main body portion causes the first pliable leg portion and the second pliable leg portion to resiliently retract, and wherein the retraction of the first pliable leg portion and the second pliable leg portion retracts the first post member from the first striker and second post member from the second striker for allowing the storage compartment door to move to an access position.

6. The storage compartment of claim 5 wherein the latching member includes a first guide member, wherein the pocket of the storage compartment door includes a first guide track for receiving the first guide member, and wherein the first guide member is slideable within the first guide track for maintaining a single axis direction of travel of the main body portion.

7. The storage compartment of claim 6 wherein the latching member includes a second guide member, wherein the pocket of the storage compartment door includes a second guide track for receiving the second guide member, and wherein the second guide member is slideable within the second guide track for maintaining the single axis direction of travel of the main body portion.

8. The storage compartment of claim 5 wherein the latching member further includes an integrally formed resilient member extending from the main body portion for maintaining the latching member at the relaxed position in the absence of a force exerted on the handle, the resilient member projecting arcuately away from the main body portion, wherein the resilient member is arcuately compressed in response to an external force applied to the handle pivoting it from the latched position to the unlatched position thereby forcing the latching member out of the relaxed position, and wherein the resilient member forces the main body portion to the relaxed position and returns the handle from the unlatched position to the latched position in response to the external force being removed.

9. The storage compartment of claim 8 wherein the pocket includes a recess for receiving the distal end of the resilient member, the distal end being fixedly secured within the recess as the resilient member arcuately compresses.

10. The storage compartment of claim 8 wherein the pocket includes an abutment surface, wherein a distal end of the resilient member is displaced as the main body portion is slidingly displaced in response to the external force exerted on the pivoting handle, wherein the distal end of the resilient member slidingly abuts the abutment surface as the handle moves to the unlatched position thereby resulting in an arcuate compression of the resilient member.

11. The storage compartment of claim 5 wherein the first pliable leg portion is serpentine shaped.

12. The storage compartment of claim 11 wherein the second pliable leg portion is serpentine shaped.

13. The storage compartment of claim 5 wherein the second side surface of the housing includes an integrally formed first arcuate guide member for maintaining a bias force against the first pliable leg portion as the first pliable leg portion is retracted, the biasing force maintained by the first arcuate guide member as the first pliable leg portion is retracted results in the retraction of the first post portion from the extended post position to the retracted post position.

14. The storage compartment of claim 13 wherein the second side surface of the housing includes an integrally formed second arcuate guide member for maintaining a bias force against the second pliable leg portion as the second pliable leg portion is retracted, the biasing force maintained by the second arcuate guide member as the second pliable leg portion is retracted results in the retraction of the second post portion from the extended post position to the retracted post position.

* * * * *